United States Patent [19]

Gauthier et al.

[11] Patent Number: 4,926,077
[45] Date of Patent: May 15, 1990

[54] RESISTANCE COMPENSATION IN A MOTOR USING A THERMALLY VARIABLE RESISTIVE NETWORK

[75] Inventors: Raymond G. Gauthier, Santa Cruz County; James N. Krause, Santa Clara County; David M. Lancisi, Santa Cruz County, all of Calif.

[73] Assignee: Seagate Technology, Inc., Scotts Valley, Calif.

[21] Appl. No.: 221,335

[22] Filed: Jul. 19, 1988

[51] Int. Cl.$^5$ ..................... H02K 11/00; H02P 8/00
[52] U.S. Cl. ................... 310/68 C; 318/634; 318/696; 310/12; 360/78.13
[58] Field of Search ............... 310/68 C, 12; 323/369; 336/179; 318/634, 788, 685, 696; 361/37, 106; 360/78.13; 369/43

[56] References Cited

U.S. PATENT DOCUMENTS

| 3,867,676 | 2/1975 | Chai et al. | 310/14 |
|---|---|---|---|
| 4,453,124 | 6/1984 | Francis et al. | 323/369 |
| 4,581,567 | 4/1986 | Yanagawa | 318/696 |
| 4,636,668 | 1/1987 | Nikaido | 310/49 R |
| 4,658,312 | 4/1987 | Elsässer et al. | 310/156 |

*Primary Examiner*—Peter S. Wong
*Assistant Examiner*—Judson H. Jones
*Attorney, Agent, or Firm*—Flehr, Hohbach, Test, Albritton & Herbert

[57] ABSTRACT

A motor is disclosed comprising a housing and a plurality of parallel stator laminations mounted on the interior wall of the housing surrounding the rotor. The stator comprises a plurality of coils wound around the stator poles. Each coil or group of coils connected in series with each other are further connected in series with a thermistor network. Preferably, the thermistor is supported on a printed circuit board mounted adjacent to the coils, with the thermistor being inserted in a space directly adjacent to or between adjacent stator coils in order for the thermistor to accurately respond to the actual operating temperature of the coils. With increases in temperature, the resistance of the negative temperature coefficient thermistor will decrease, lowering the resistance of the motor circuit and maintaining the L/R time constant of the system. The opposite effect will occur with decreasing tempreature. To adjust for the fact that thermistors that accurately reflect the changes in resistance of the wire used to wind the coils with changes in temperature are not available, a resistor is wired in parallel with the thermistor, the resistor having a value chosen to modify the total resistance represented by the thermistor network to the coils so that the compensation is accurate over a wide range of changes in temperature and motor design. The shunt resistor allows flexibility in motor design, as it can have any selected value from zero to infinity to compensate for variations in motor design.

8 Claims, 13 Drawing Sheets

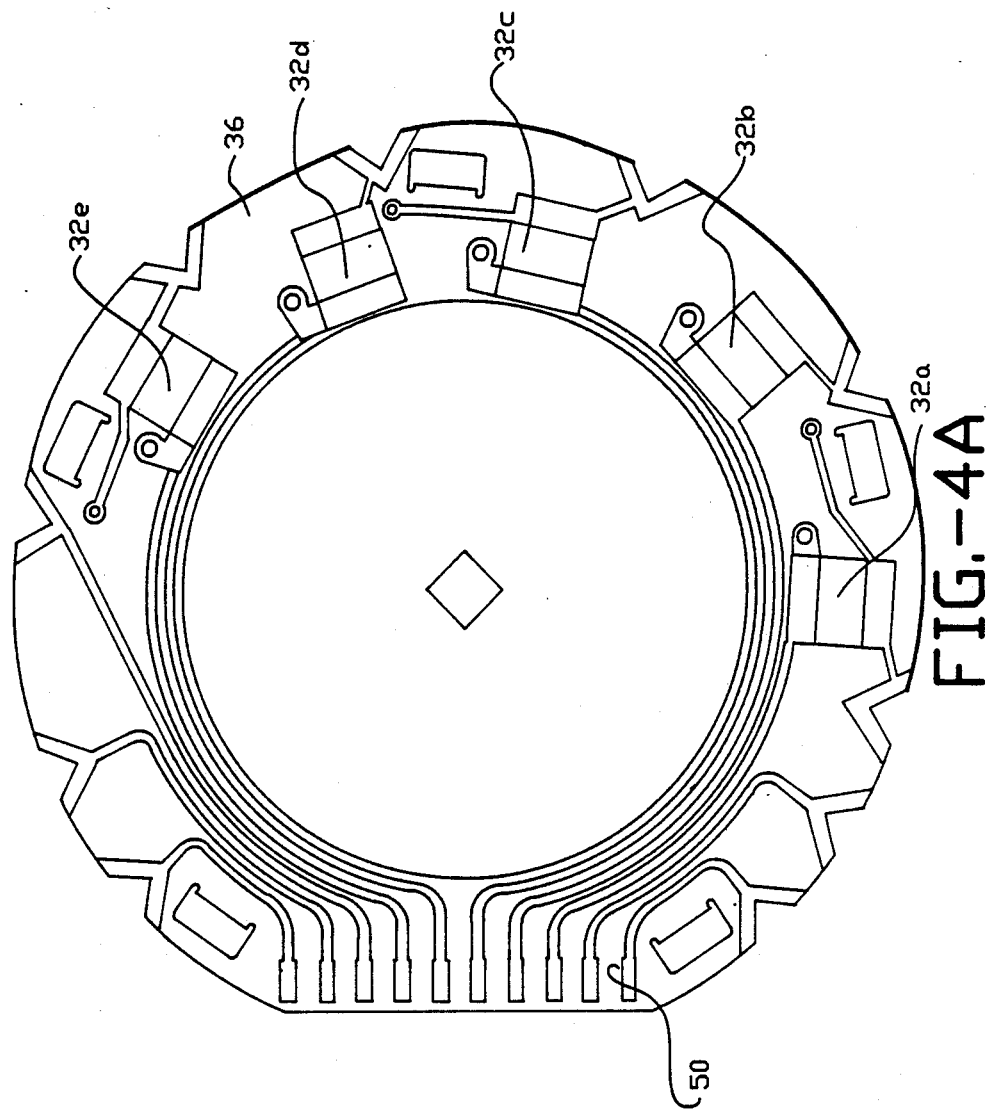

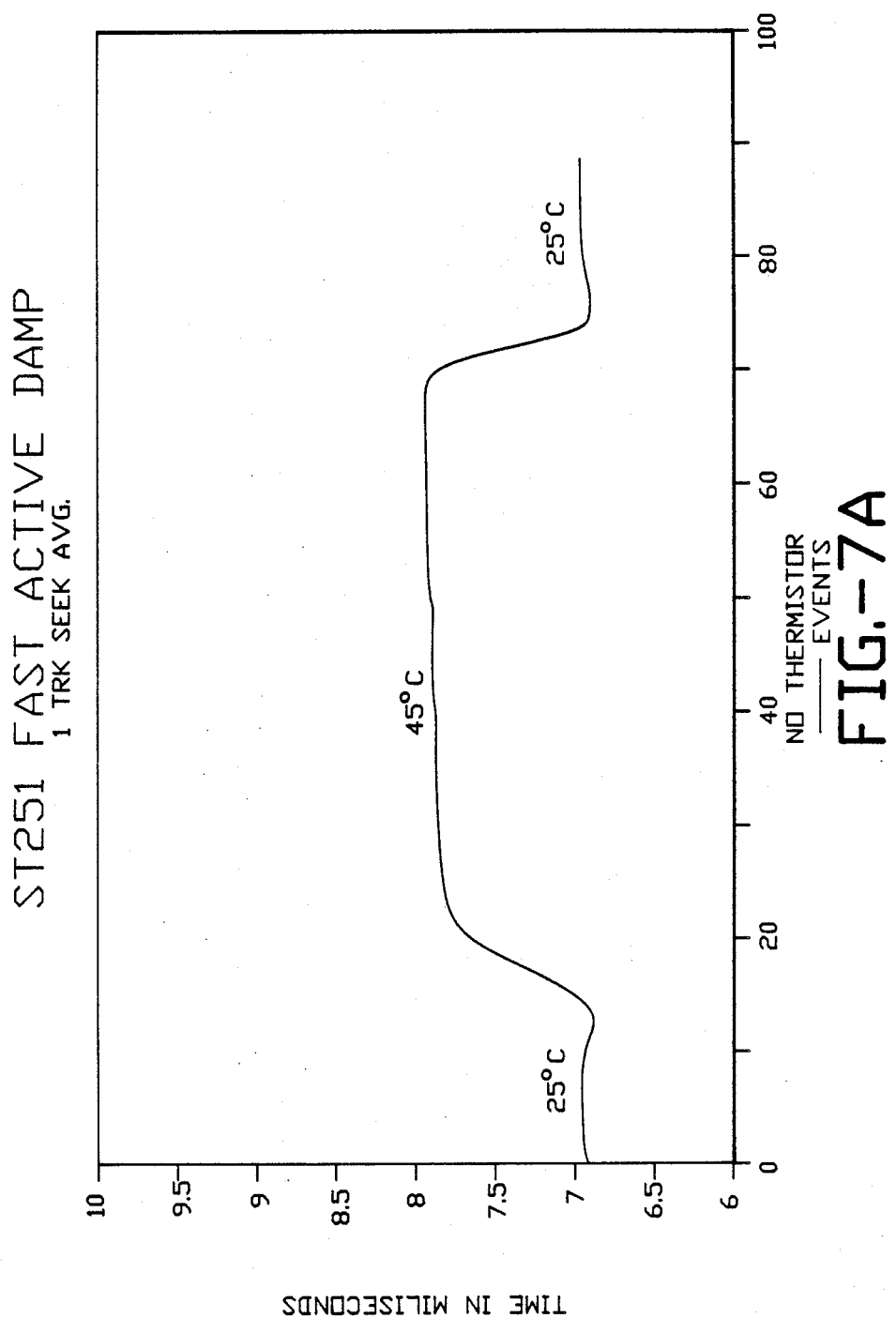

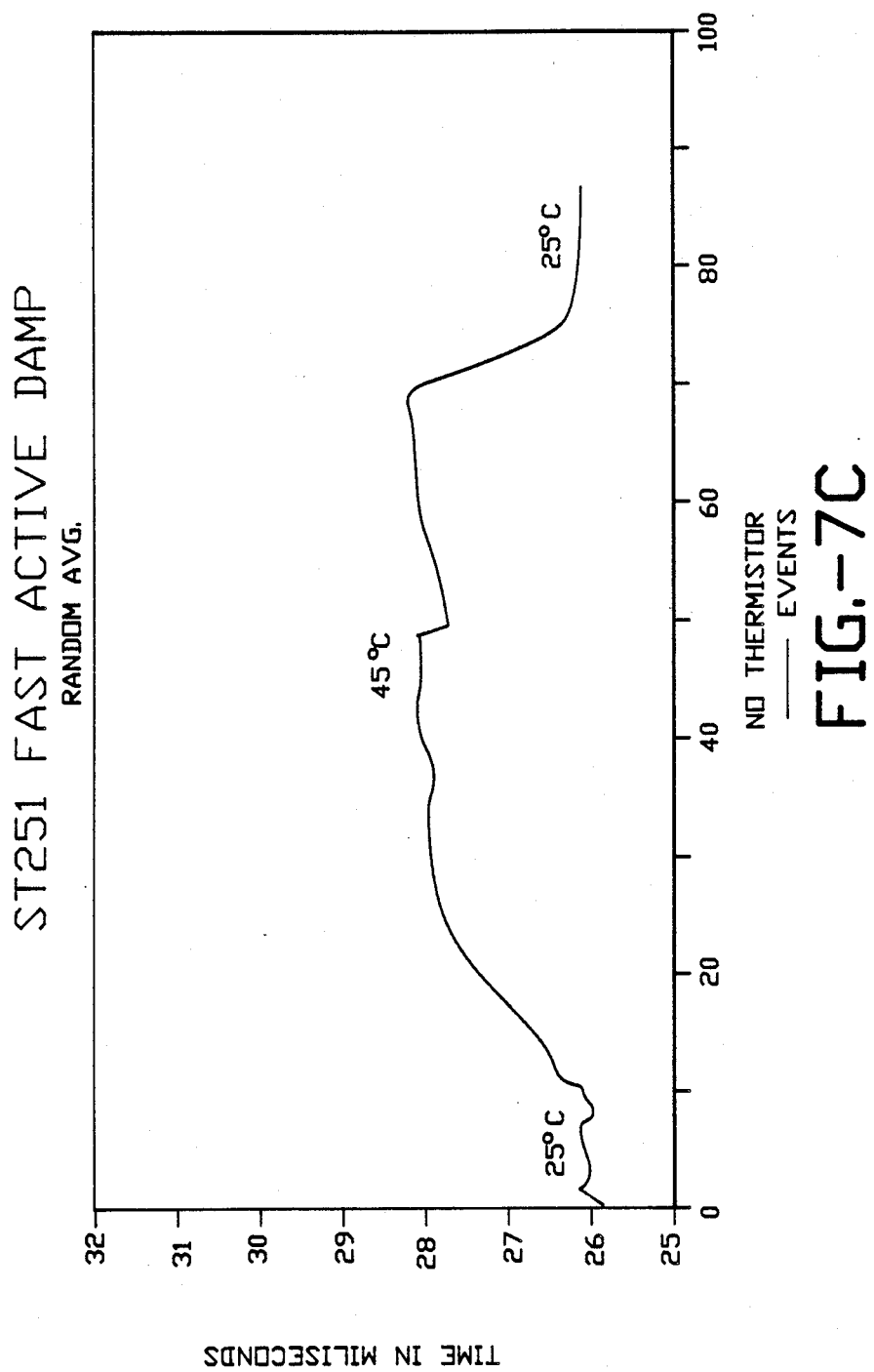

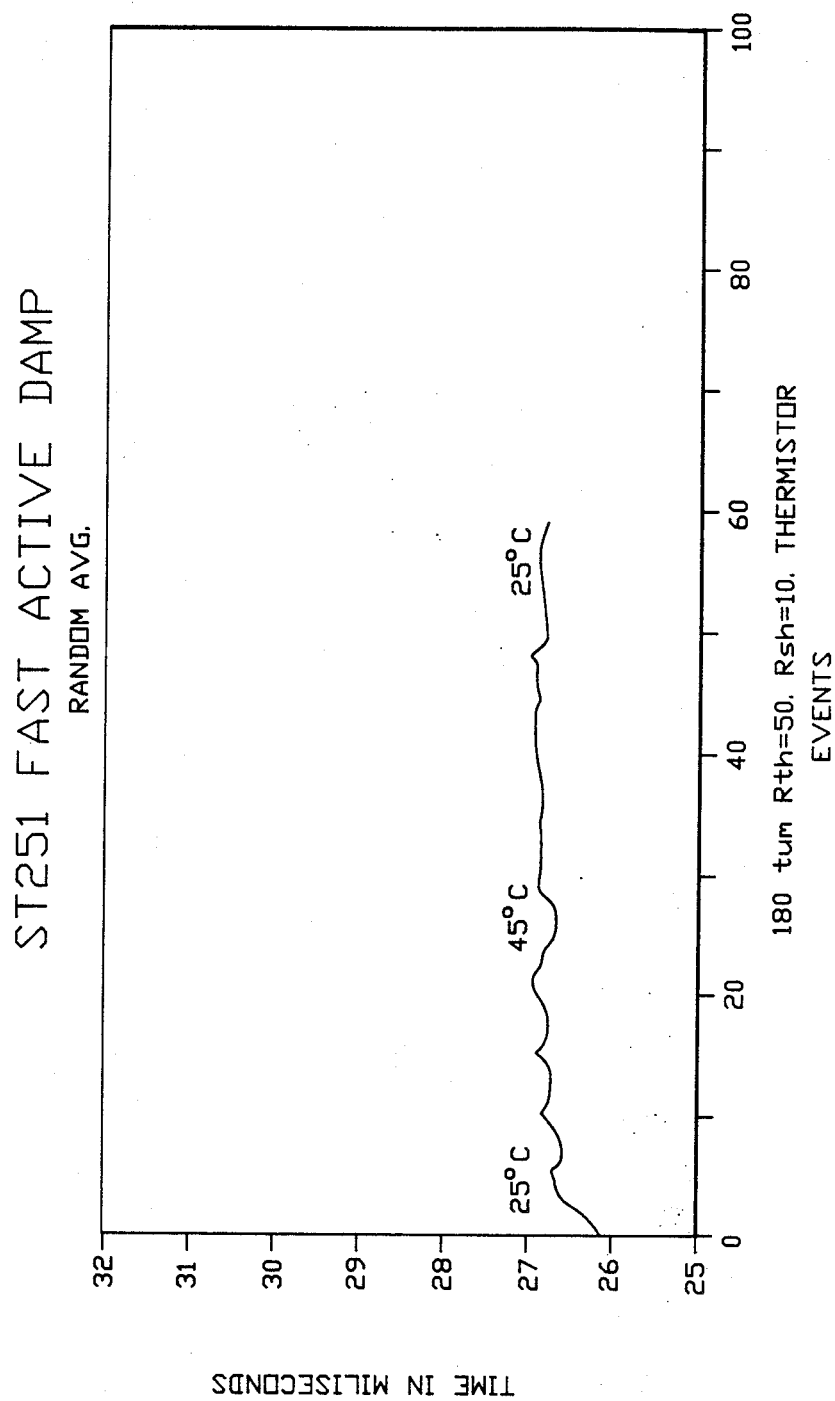

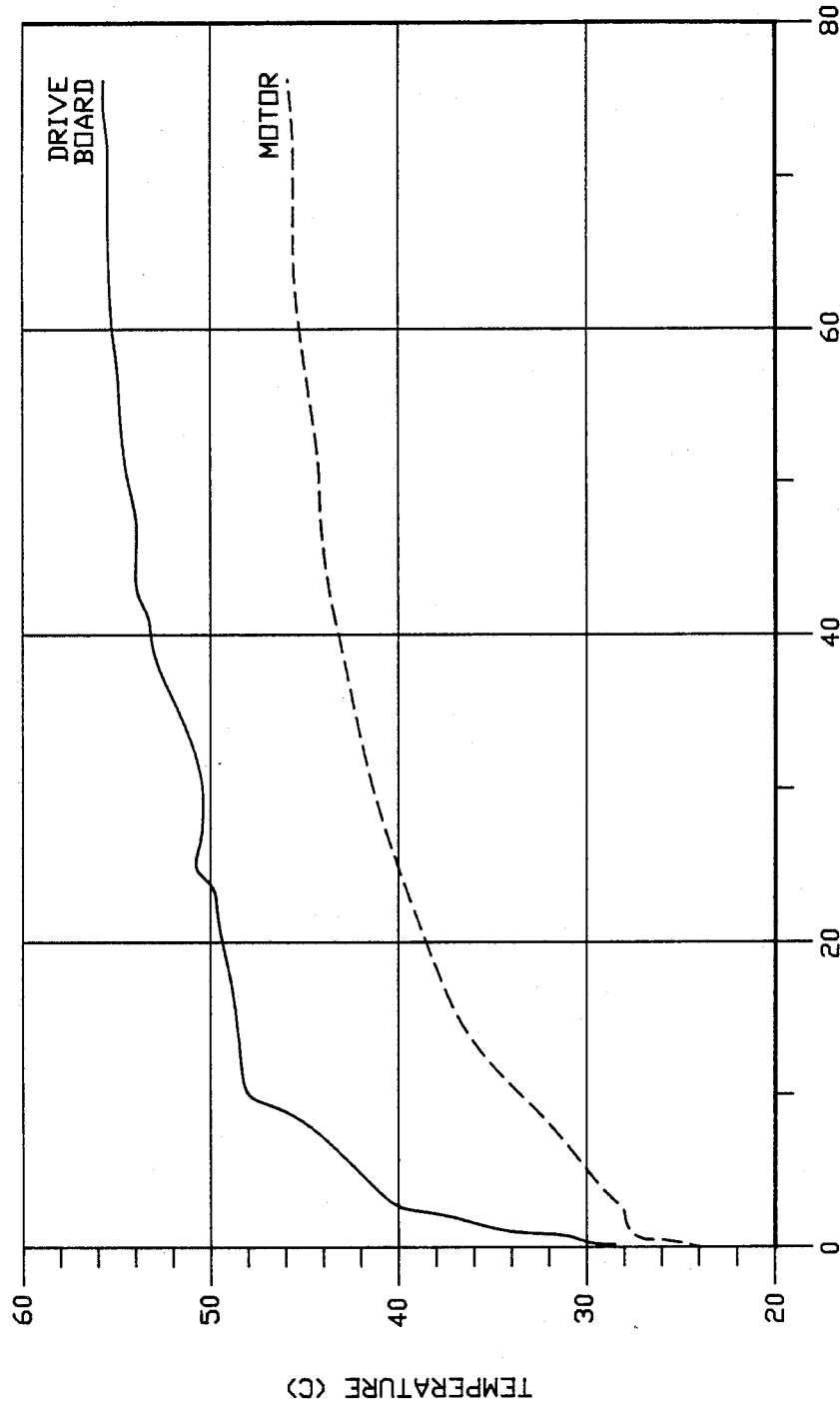

RESISTANCE COMPENSATION IN A MOTOR USING A THERMALLY VARIABLE RESISTIVE NETWORK

CROSS-REFERENCE TO RELATED APPLICATION

This invention is useful, for example, in the motor disclosed in U.S. application Ser. No. 116,374 filed Nov. 2, 1987, by E. Klein, entitled SINGLE HOUSING STEPPER MOTOR.

FIELD OF THE INVENTION

This application is directed to stepper motors for use in disc drives, and more particularly to a method and apparatus for compensating for motor resistance changes due to temperature variations.

BACKGROUND OF THE INVENTION

In the typical disc drives using a stepper motor, one must develop an algorithm for controlling the stepper motor to move the head from one track to another selected track that may be 100 or more tracks away. In the process of doing this, the motor is accelerated to very high speeds and then rapidly decelerated and stopped. This rapid acceleration and deceleration is implemented in part by putting the time between each step pulse in a lookup table accessible by the motor controlling microprocessor. These time periods are critical to the drive performance. A 1 microsecond shift in those time periods can throw the time periods off, so that the settling of the head relative to the tracks on the disc drive is no longer optimum.

Since the steppe3r motor in a hard disc drive will be exposed to a specific broad, prespecified thermal range (4° C. to 70° C.), the winding resistance of the stepper motor will change due to the varying temperature. This change is predictable and repeatable. Typically, the motor resistance (Rm) will change about 1.393%/ C. An equation for the motor resistance at any temperature can be expressed as the following:

$$R_m = R_o + R_o T_{cm}(T - T_0) \quad (1)$$

where $R_o$ = Nominal resistance at ambient room temperature
$T_{cm}$ = Thermal resistive coefficient (0.393%/° C. for copper)
$T_0$ = Ambient room temperature of 25° C.
T = operating temperature It is detrimental to motor performance to have this increase in resistance at higher temperatures, since it reduces motor torque (from that at lower temperatures) and alters the L/R time constant of the system. The alteration of the L/R time constant is particularly harmful because the motor step algorithm that incorporates the lookup table described above cannot be retuned to account for this change in the electrical system.

The alteration of the current will result in a torque change in the motor. This change in torque can be minimized in part by tuning the motor voltage as is done by most disc drive manufacturers; but to a certain extent, the proper tuning of the motor is overcome by this change in current, since the change in motor voltage accomplished by tuning can partially change the current to compensate for the resistance changes, but the correction cannot be as complete and accurate as desired. That is, the L/R time constant will not change as the voltage applied to the phase is changed, and therefore, tuning by modification of the applied voltage will not accurately compensate for this alteration in the system. Thus, the potential alteration of the L/R time constant with changes in temperature must be accounted for in some other way in order to maintain the high degree of accuracy required in a disc drive.

SUMMARY OF THE INVENTION

Therefore, it is an objective of this invention to provide a motor for use in a disc drive whose performance is made more reliable and is better insulated from variations in the motor torque induced by changes in the operating environment temperature.

More particularly, it is an objective herein to provide a method for compensating for a change in motor coil resistance due to varying temperature during a disc drive's period of operation by the use of negative temperature coefficient thermistors.

A related objective is to incorporate negative temperature coefficient thermistors in a disc drive motor to avoid variations in the L/R time constant, and thereby motor torque variations with changing operating temperatures.

These and other objectives are achieved in a motor which in a preferred embodiment is a stepper motor comprising a housing and a plurality of parallel stator laminations mounted on the interior wall of the housing surrounding the rotor. The stator comprises a plurality of coils wound around the stator poles. Each coil or group of coils connected in series with each other are further connected in series with a thermistor network. Preferably, the thermistor is supported on a printed circuit board mounted adjacent to the coils, with the thermistor being inserted in a space directly adjacent to or between adjacent stator coils in order for the thermistor to accurately respond to the actual operating temperature of the coils. With increases in temperature, the resistance of the negative temperature coefficient thermistor will decrease, lowering the resistance of the motor circuit and maintaining the L/R time constant of the system. The opposite effect will occur with decreasing temperature. Constant torque is thereby maintained over a range of temperatures.

To adjust for the fact that thermistors that accurately reflect the changes in resistance of the wire used to wind the coils with changes in temperature are not available, a resistor is wired in parallel with the thermistor, the resistor having a value chosen to modify the total resistance represented by the thermistor network to the coils so that the compensation is accurate over a wide range of changes in temperature and motor design. The shunt resistor allows flexibility in motor design, as it can have any selected value from zero to infinity to compensate for variations in motor design. If such flexibility is not necessary, the thermistor and resistor could be incorporated in a single package.

BRIEF DESCRIPTION OF THE DRAWINGS

The features and advantages of this invention will be better understood from reference to the following drawings, wherein

FIG 4 illustrates one side of the printed circuit board that fits over the bottom of the coils that appear in FIG. 2 and supports the shunt resistors and thermistor circuits of this invention;

FIGS. 7A–7D illustrate the effect on access time of incorporation this invention in an actual disc drive; and FIGS. 8 and 9 illustrate an alternative embodiment showing the effects of incorporating this invention on a printed circuit board external to the motor tested under simulated operating conditions.

DETAILED DESCRIPTION OF A PREFERRED EMBODIMENT

Figure 1:
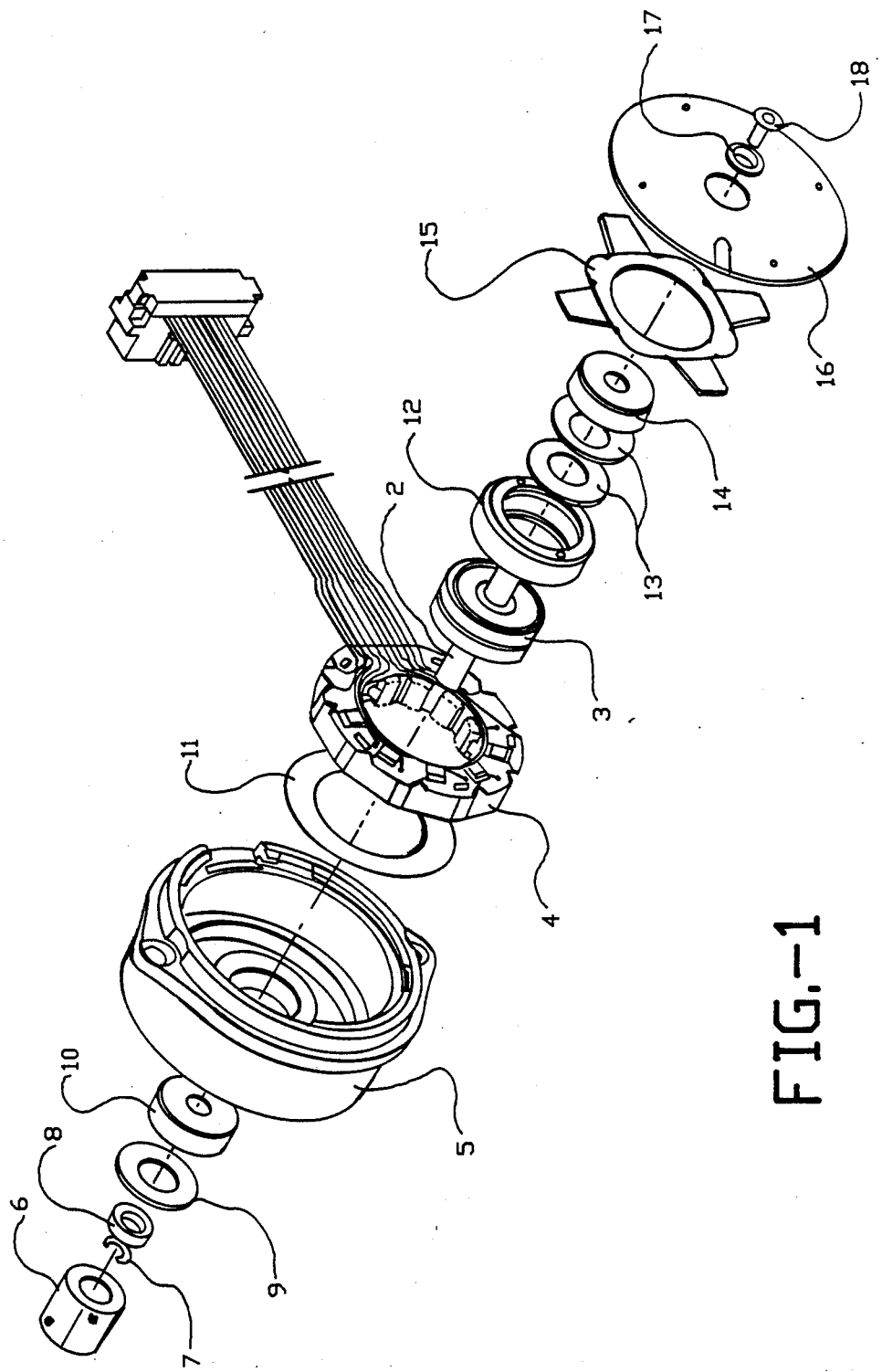
FIG. 1 is an exploded view of a stepper motor incorporating the present invention.

Referring first to FIG. 1, the essential elements of the motor of the type that may incorporate this invention are shown. This motor is described solely for the sake of example, and the utility of this invention is not limited to this particular motor design. Details of the motor design that appear in FIG. 1 may be found in the application of Enrique Klein referred to above.

The motor 1 includes a central shaft 2 supporting a rotor 3 for rotation with selective activation of the stator coils incorporated in the stator stack 4. The stator stack 4 is supported within the housing 5 to maintain its alignment with rotor 4. The top of the shaft 2 carries a pulley 6 having pins (for example) used to attach bands that are distally connected to a carriage mounting read/write transducers for select positioning of the carriage with rotation of the shaft. The upper end of the shaft also carries, below pulley 6, a retaining ring 7, seal sleeve 8, magnetic seal 9, and ball bearing 10. The stator stack is insulated from the housing by insulator 11. Below the rotor 3, along shaft 2 can be found the bearing holder 12, disc spring 13 for maintaining the bearing holder in place, rear ball bearing 14 and retaining spring 15. The assembly is completed with rear cover 16, washer 17 and screw 18 which hold the assembled motor together.

Figure 2:
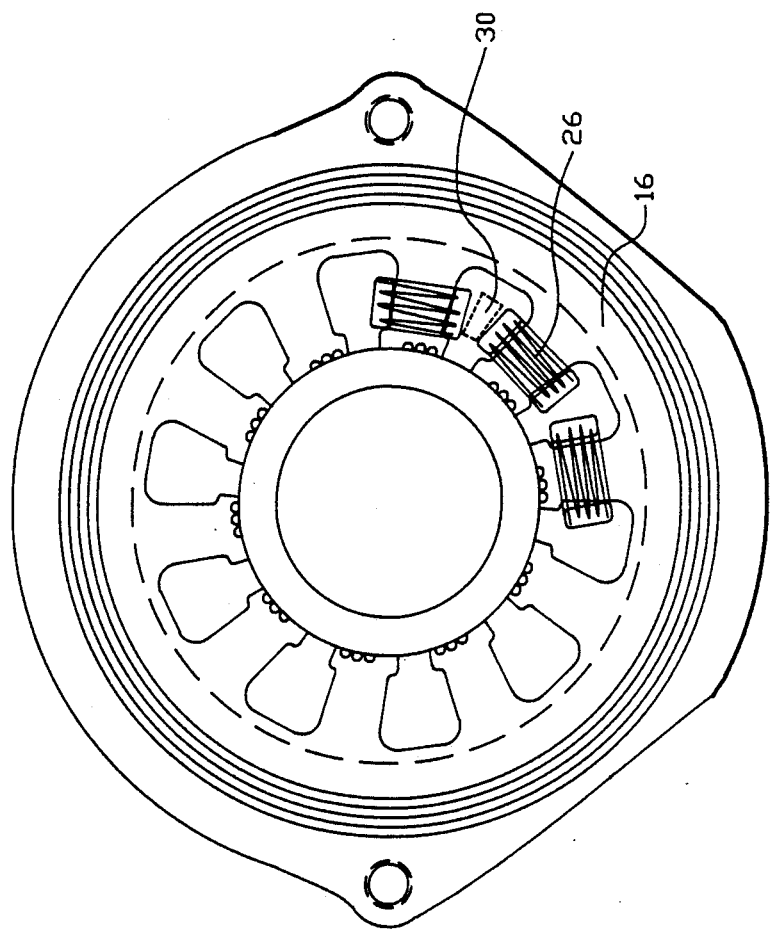
FIG. 2 is a bottom plan view of the motor of FIG. 1 with the PCB removed showing the arrangement of the stator coils and the rotor.

As shown in greater detail in the bottom plan view of FIG. 2, a plurality of actuator poles 26 are provided on which the coils 28 of the stator are wound. As discussed above, it is the change in resistance of the wires of the stator coils 28 with varying temperature within the motor housing that must be compensated for. If accurate compensation can be incorporated, the stepper motor coils act as an electrical load with an essentially constant resistance over the normal specified operating temperature range of the disc drive.

Figure 3:
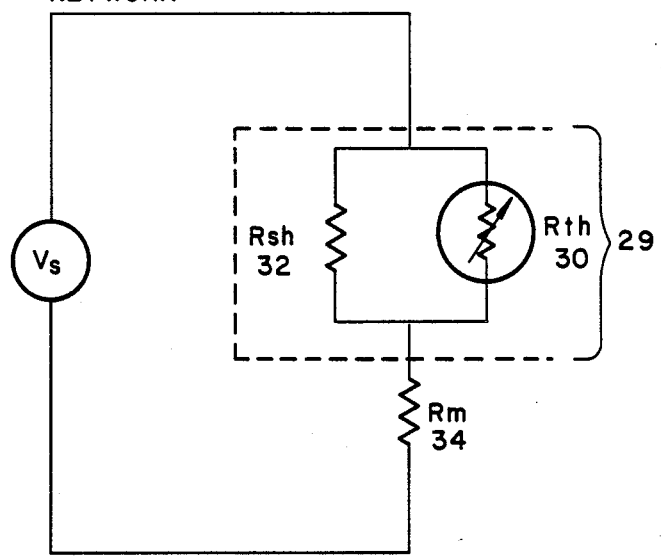
FIG 3 is a schematic of the thermistor circuit of the invention.

On a printed circuit board mounted immediately below the stator coils, a thermistor network 29 as shown in FIG. 3 is provided in series with each coil or serially connected group of coils. The network consists of a thermistor 30 chosen to have a characteristic of decreasing electrical resistance with increasing temperature identified as $R_{th}$ 30. To allow for differences in stator coil designs, a shunt resistor $R_{sh}$ 32 is provided to modify the resistive characteristic of the thermistor compensation network to the desired value. The resistor 32 and thermistor 30 network is placed in series with the resistance of the motor coils $R_m$ 34. In the illustrated embodiment of this invention, 10 coils are used in the motor; they are serially connected in pairs, with a thermistor compensation network 29 of the type shown in FIG. 3 being connected in series with each coil pair.

Figure 4B:
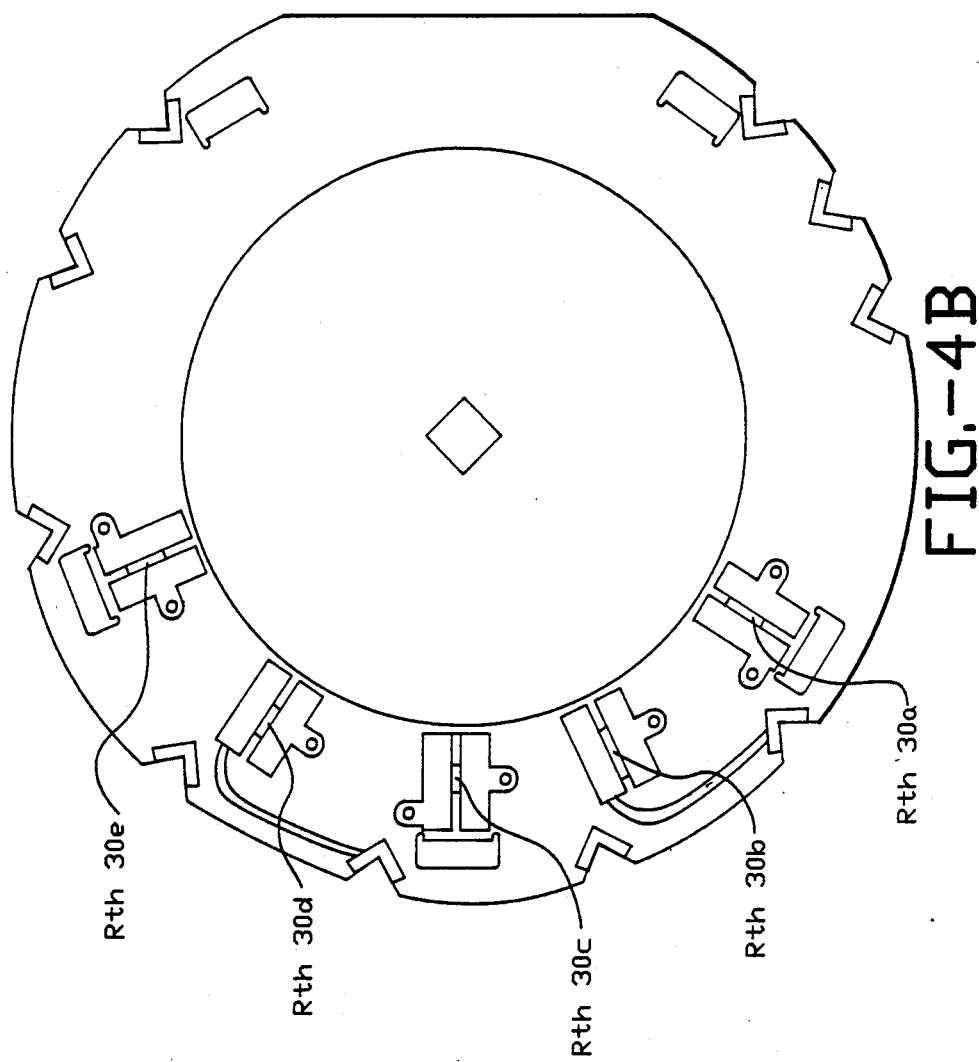
FIG. 4B illustrates in plan view the other side of the printed circuit board that supports the thermistor circuits of this invention.

The actual mounting of the network can be seen in FIGS. 4A and 4B. FIG. 4A shows a printed circuit board 36 of a type normally mounted in a stepper motor with the wire traces 50 that provide the connections to the stator coil wires. The board 36 has been modified to accommodate the resistors $R_{sh}$ 32 not shown on FIG. 4A which will be mounted on the side of the board away from the coils. The thermistors $R_{th}$ 30 are mounted on the opposite side of the board as shown in FIG. 4B. The thermistors 30 are located and spaced to be closely adjacent to and preferably protruding between the stator coils 28 so that the temperature of the thermistor $R_{th}$ 30 accurately reflect the temperature of the coils.

The electrical schematic of the network is shown in FIG. 3. From this schematic, equations can be written to describe the resistive behavior of a particular phase which comprises a pair of coils as follows:

$$R_{tot} = \frac{R_{sh}R_{th}}{R_{sh} + R_{th}} + R_m \tag{2}$$

where:

$R_{th}$ = f(temp) = thermistor resistance
$R_m$ = f(temp) = motor winding resistance
$R_{sh}$ = fixed shunt resistor Since both the motor and thermistor resistance ($R_m$ and $R_{th}$) are a function of temperature, expressions can be written to describe the total network resistance as a function of temperature.

For the thermistors used in prototype testing, the recommended resistive equation can be written as shown.

$$\frac{R_{th}}{R_{25}} = e^{\beta \frac{1}{T_k} - \frac{1}{T_{k0}}} \tag{3}$$

where:

$\beta$ = thermistor material constant
$R_{th}$ = resistance at absolute temperature $T_k$
$R_{25}$ = resistance at absolute temperature $T_{k0}$ (given by manufacturer specifications)
$T_{k0}$ = 298.15° K. = 25° C.

Equations 1 and 3 can be substituted into equation 2 to yield a final expression for the total resistance of a particular motor coil circuit as a function of temperature. The final expression can be simulated by a computer to graphically show the effect of the thermistor circuit presence.

Figure 5:
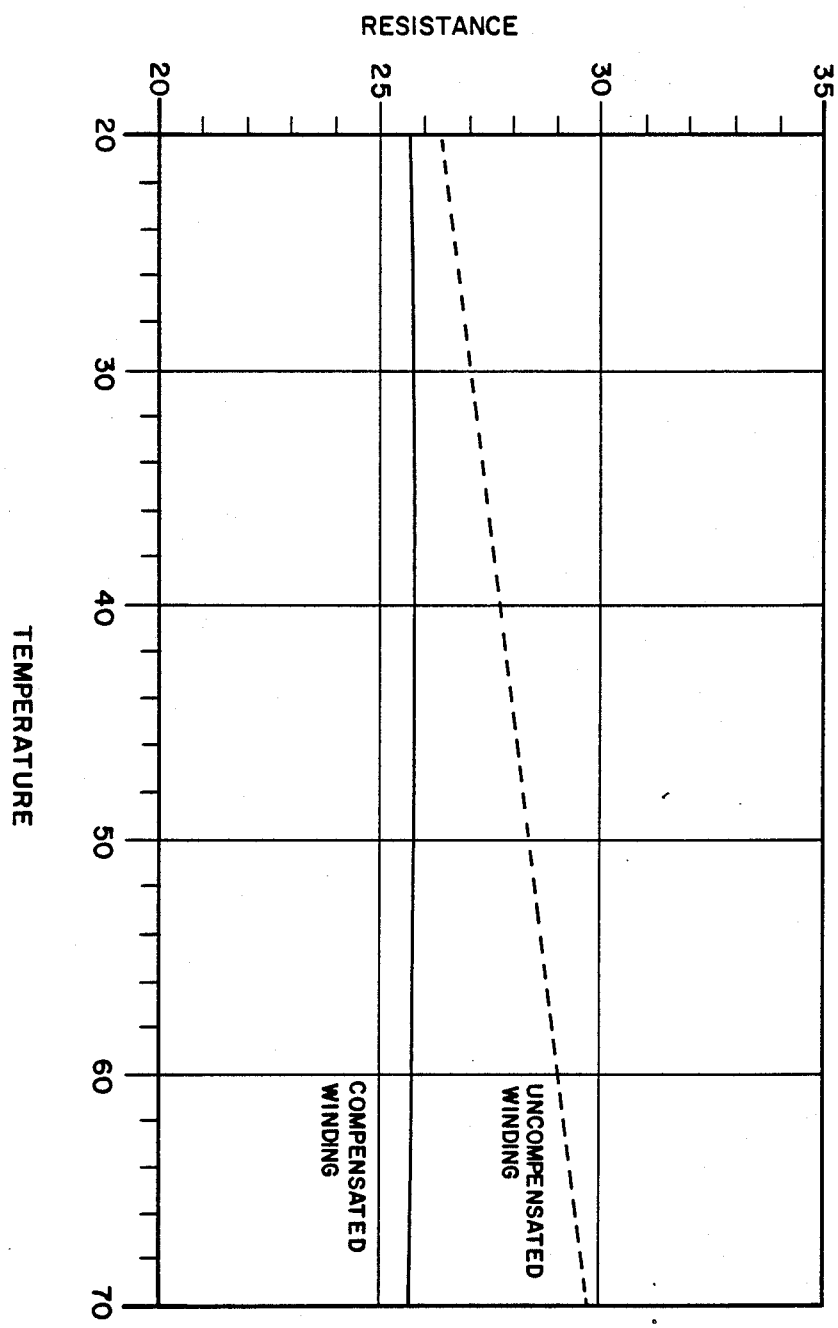
FIG. 5 illustrates resistance of the motor coil wire both compensated and uncompensated with changes in temperature.

The dashed line in FIG. 5 shows an analytical plot of resistance versus temperature for a typical stepper motor incorporating a resistor in series with the motor coils. It also shows a plot (solid curve) of the total motor coil circuit resistance versus temperature including the thermistor temperature compensation network shown in FIG. 3 with the following parameters used:

$R_m = 16.5_D$ (at 21.8° C.) $R_{25} = 50_D$ (at 25° C.)

-continued $$R_{sh} = 11_D \text{ (fixed carbon)} \quad \beta = 3000$$

Here it can be seen that the conventional motor resistance with $10_D$ series resistor will deviate approximately 3.1 over the total temperature range (about 19% change overall) where the resistance of the thermistor network compensated motor coil circuit is almost perfectly constant.

Figure 6:
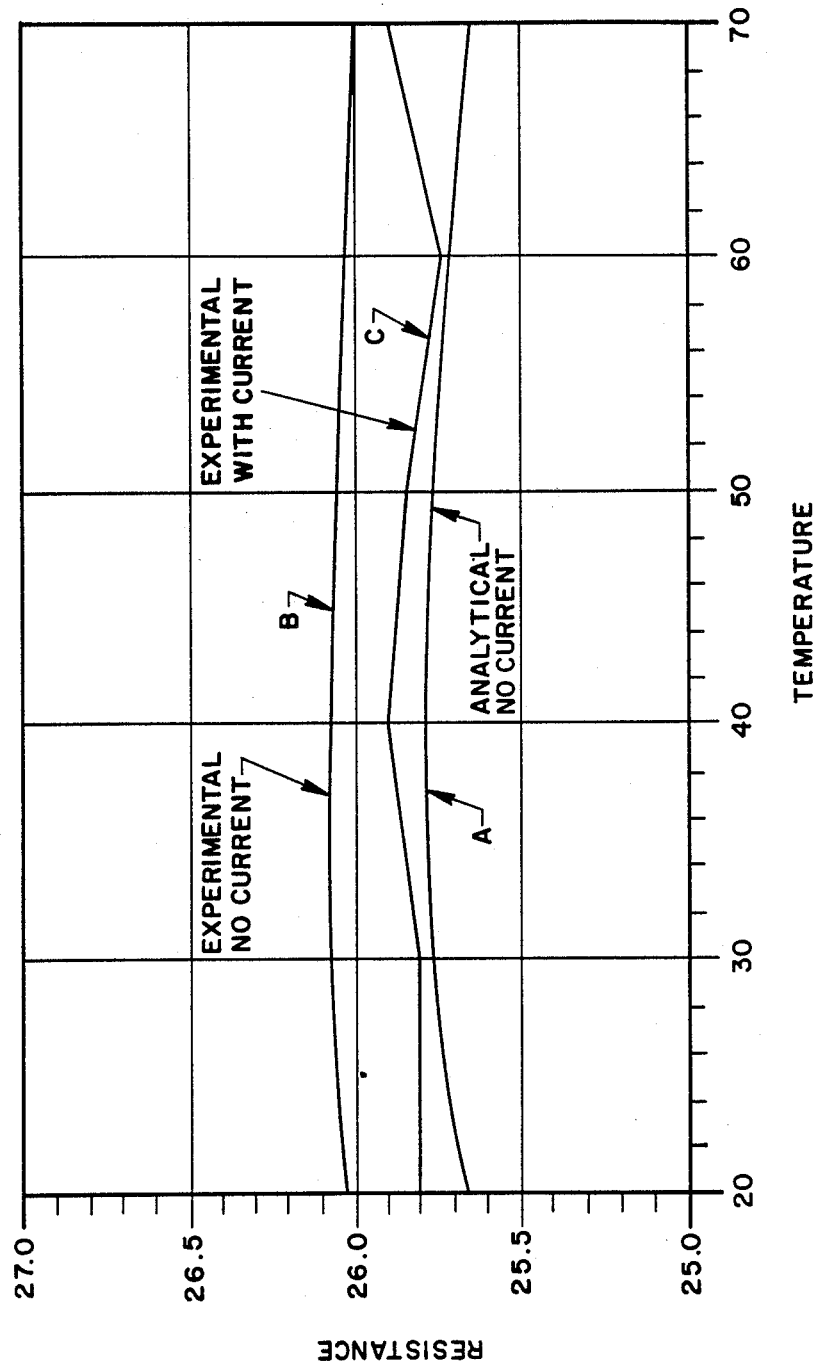
FIG. 6 illustrates the effect of the thermistor compensation network in modifying the resistance with temperature.

Testing was performed to experimentally verify the computer simulation; the results can be found in FIG. 6. Here, three different sets of curves can be seen. The line A represents the analytical simulation data, line B represents experimental testing with no current in the motor coil circuit, and finally, the line C represents the motor coil circuit energized with approximately 125 milliamps. Here, it can be seen that the curve C shifted downward by about $0.5_D$ from the curve B when current was applied to the motor coil circuit. This is due to the inherent self-heating effect of the thermistor. When current is applied to a resistive load, power is dissipated in the form of heat (IR loss). This causes an increase in thermistor temperature which translates to a slight decrease in thermistor resistance.

Drive level testing was also performed and the results can be seen in FIGS. 7A–7D. The curves in these figures represent the access times of the thermistor motor with and without the compensation of this invention.

Figure 7B:
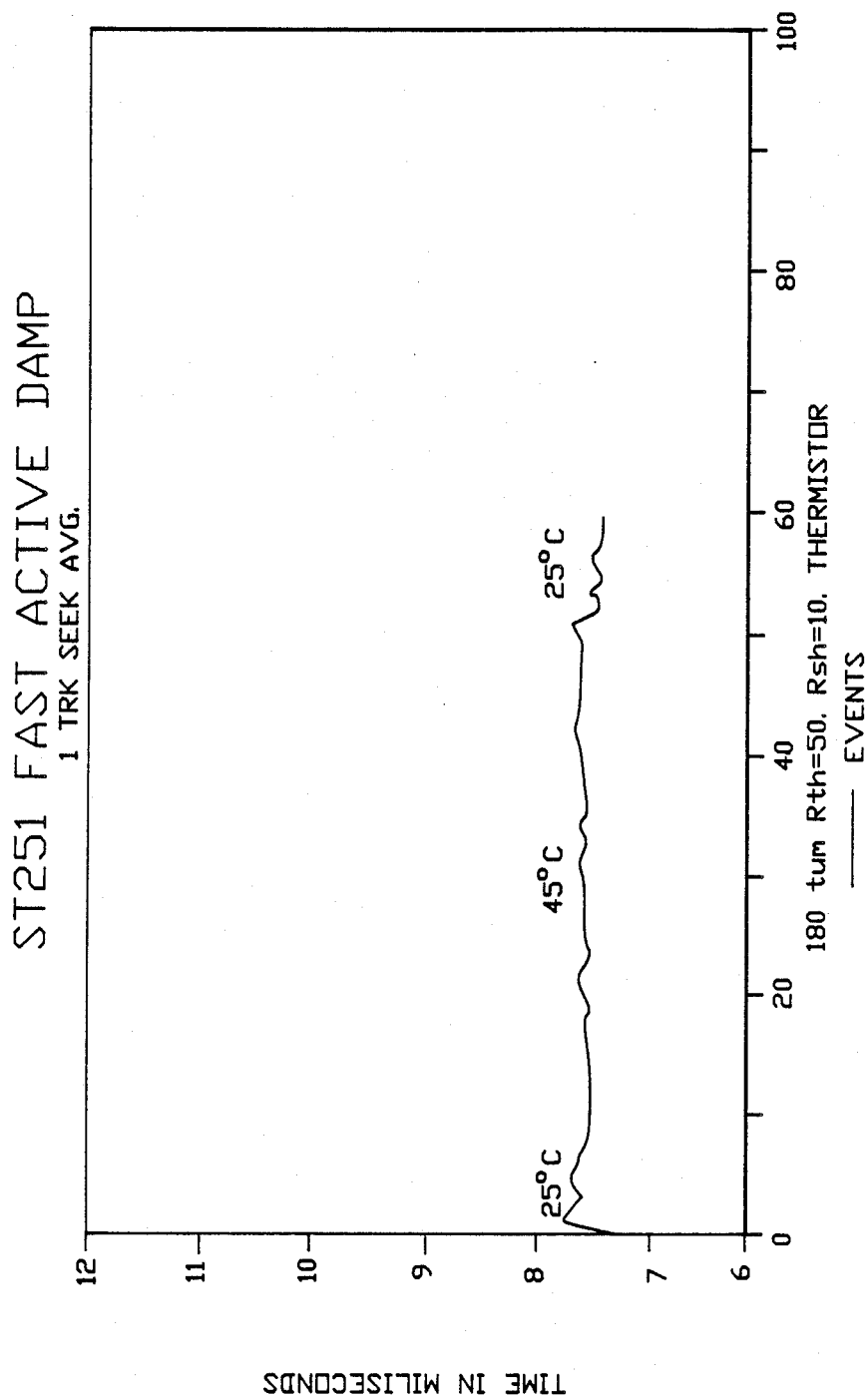

FIGS. 7A and 7C illustrate a single track average seek time and random average track seek time without the thermistor used according to this invention. FIG. 7B and 7D illustrate the maintenance of low access times with changes in temperature if this invention is used.

From these tests, it can be concluded that the thermistor network will compensate for the resistance change due to temperature change of the motor windings. Alternatively, the thermistor compensation circuit can be located on a board external to the motor.

In order to be able to predict how the thermistor circuit will affect the overall resistance if it is mounted on an external board rather than in the motor, testing was done to show how the external board temperature deviates from the motor temperature. For this, tests were done in which the temperatures of the motor and the external board were monitored for a period of about 70 minutes. The experimental results from these tests can be seen in FIG. 8.

From these tests, it can be seen that the drive board stays approximately 10° C. hotter than the motor. This was entered into the computer simulation and a new optimum thermistor and shunt combination was found.

Figure 9:
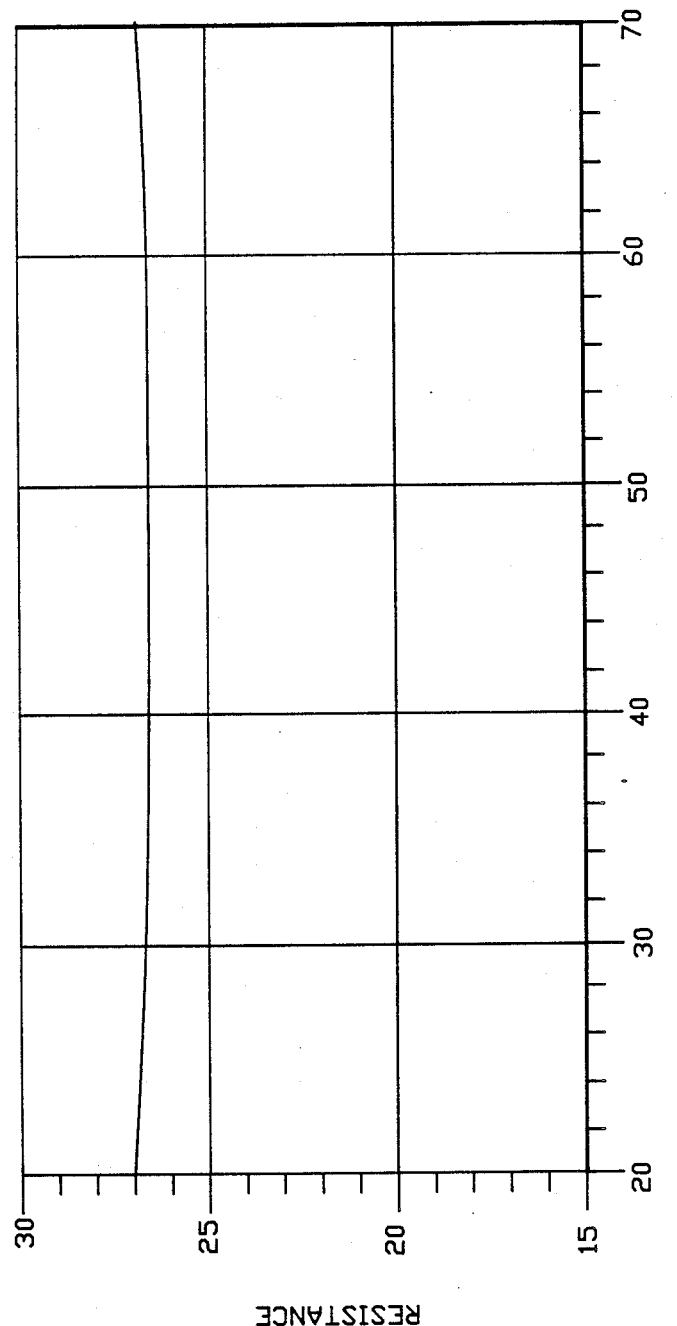

FIG. 9 shows a plot of the total resistance (of both the thermistor network and motor coils) versus temperature for the external board mounted thermistor. It can be seen from this plot that with a $20_D$ thermistor and a $12_D$ shunt resistor, the circuit can be accurately compensated with the thermistor mounted on the drive board.

Modifications of this invention may occur to a person of skill in the art who studies this disclosure. Therefore, the scope of the invention is to be limited only by the following claims.

What is claimed is:

1. In a stepper motor for a disc drive comprising a housing, a rotating shaft mounted in said housing for carrying a rotor, a plurality of stator coils mounted in parallel on the inner surface of said housing, a printed circuit board supported by said housing adjacent exposed ends of said coils, and a microprocessor for supplying controlling step pulses to said motor at periodic intervals established in an open-loop look-up table in a memory associated with said microprocessor, and at least one thermistor mounted on said printed circuit board adjacent said coils and connected to at least one of said coils and responsive to temperature changes in said coils to maintain total motor resistance at a constant level over a range of operating temperatures of said motor, whereby the controlling step pulses applied by said microprocessor accurately position said stepper motor over a wide range of temperatures.

2. A motor for a disc drive as in claim 1 wherein said motor coils are connected in series pairs, a thermistor connected in series with each of said pairs and mounted adjacent said coils for sensing the temperature of said coils, the resistance of the thermistor changing with temperature to modify the voltage to the coils.

3. A motor for a disc drive as in claim 2 wherein said coils are circumferentially spaced at regular intervals around the interior surface of said housing, said thermistors being connected to each series pair of said coils and supported by said printed circuit board closely adjacent and protruding between said coils.

4. A motor for a disc drive as in claim 3 further including a resistor in parallel with each said thermistor.

5. In a disc drive, a stepper motor comprising a housing, a rotating shaft mounted in said housing for carrying a rotor, a plurality of stator coils mounted within said housing, control wires leading to said coils for selective energization thereof for causing rotation of said rotor, and a microprocessor for supplying controlling step pulses to said motor at periodic intervals established in an open-loop look-up table in a memory associated with said microprocessor, said drive further comprising a printed circuit board supporting termistors connected in series with said coils and responsive to temperature changes in said drive to maintain total motor resistance at a constant level over a range of operating temperatures of said motor, whereby the controlling step pulses applied by said microprocessor accurately position said stepper motor over a wide range of temperatures.

6. A disc drive as in claim 5 wherein said motor coils are connected in series pairs and one of said thermistors is connected in series with each of said pairs for sensing the temperature in said disc drive, the resistance of the thermistor changing with temperature to modify the voltage to the coils.

7. A disc drive as in claim 6 including a resistor in parallel with each said thermistor to form a thermistor circuit capable of adjusting the performance of the motor with temperature regardless of spacing of the thermistors from the motor coils.

* * * * *